(No Model.)

W. B. DICKSON.
WEIGHING AND REGISTERING MACHINE.

No. 515,953.  Patented Mar. 6, 1894.

Witnesses:
M. P. Smith
G. M. Thorpe

Inventor:
Wm. B. Dickson
By Hudson & Hudson
Attys.

UNITED STATES PATENT OFFICE.

WILLIAM B. DICKSON, OF KANSAS CITY, MISSOURI.

WEIGHING AND REGISTERING MACHINE.

SPECIFICATION forming part of Letters Patent No. 515,953, dated March 6, 1894.

Application filed August 21, 1893. Serial No. 483,602. (No model.)

*To all whom it may concern:*

Be it known that I, WILLIAM B. DICKSON, of Kansas City, Jackson county, Missouri, have invented certain new and useful Improvements in Ice-Meters, of which the following is a full, clear, and exact description, reference being had to the accompanying drawings, forming a part hereof.

My invention relates to ice meters, and has for its object to produce a positive and reliable weight-registering device which may be connected operatively to any ordinary spring-balance, but which is adapted more particularly for use in connection with the spring-balance illustrated in the accompanying drawings, and for the purpose of registering the amount of ice placed in a refrigerator.

With the above object in view, my invention essentially consists in the combination with a balanced platform located in the ice compartment of a refrigerator, and operatively connected to a spring of predetermined resistance, of a toothed register-disk operatively connected to rotate forward each time weight or pressure is applied upon the platform (except when otherwise desired) and expose to view the amount in pounds and fractions thereof of ice upon the platform, or rather the total weight of ice which has been placed upon the platform since the pointer indicated zero upon the register-disk.

The invention further consists in means whereby the spring may be relieved of the weight of the ice, after the amount has been registered by the rotation of the disk.

The invention finally consists in the peculiar and novel construction and arrangement of its parts, whereby the whole is formed into an operative combination, as hereinafter described and claimed, and illustrated in the accompanying drawings, in which—

Figure 1:
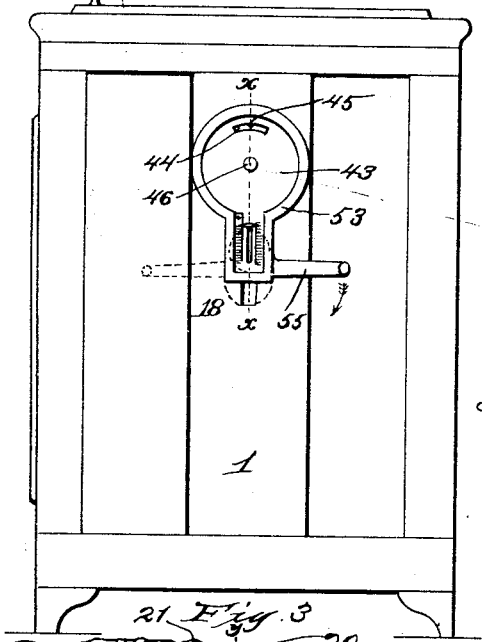
Figure 2:
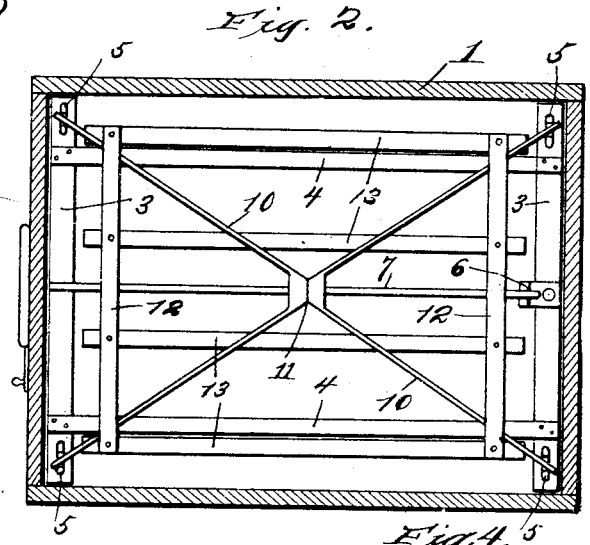
Figure 3:
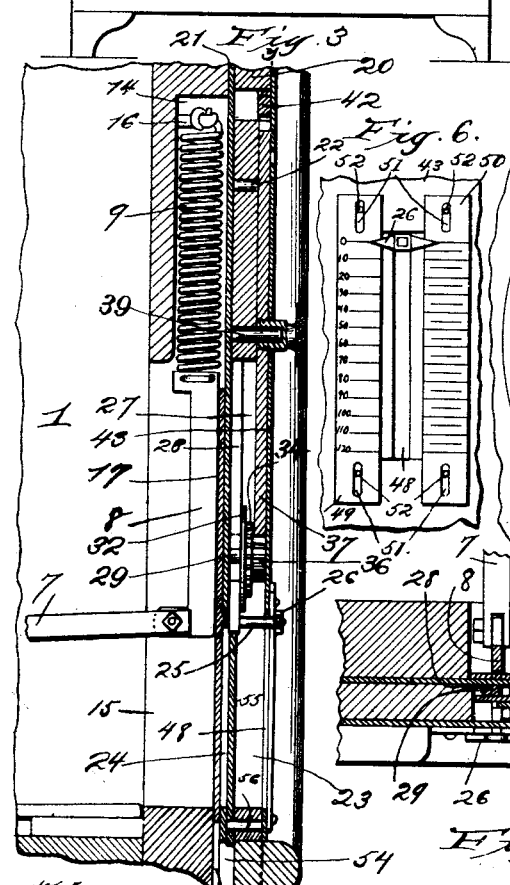
Figures 4, 5, 6:
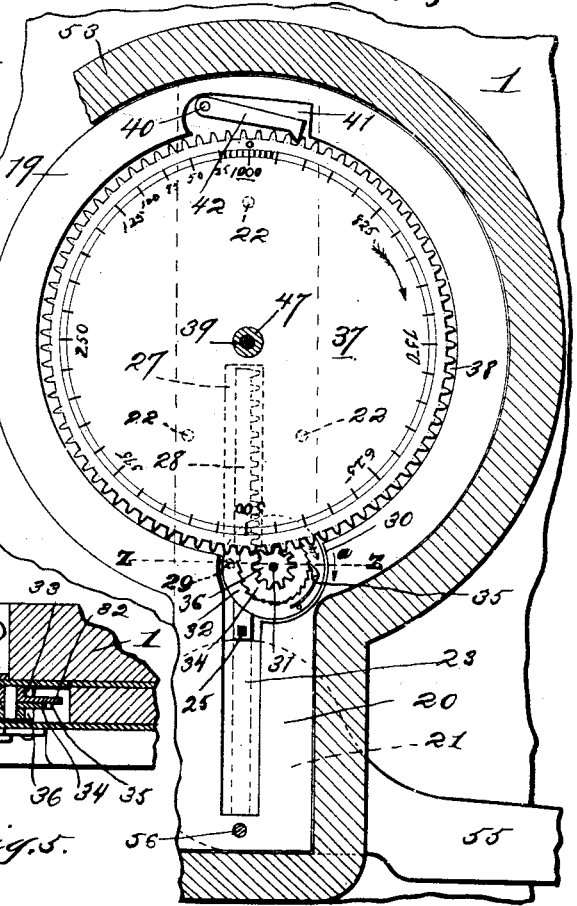

Figure 1, is an end-view of a refrigerator provided with an ice-meter constructed in accordance with my invention. Fig. 2, is a horizontal sectional view of the refrigerator taken above the ice-meter to show the ice compartment and the scale platform therein to receive the ice. Fig. 3, is a vertical sectional view on an enlarged scale on the line $x$—$x$ of Fig. 1. Fig. 4, is a vertical sectional view taken on the line $y$—$y$ of Fig. 3; said section being just inside the face plate to show more clearly the interior construction of the register mechanism. Fig. 5, is a horizontal sectional view taken on the line $z$—$z$ of Fig. 4. Fig. 6, is a front view to show the vertically adjustable scale plates.

Referring to the said drawings, 1 designates a refrigerator of the ordinary construction, and 2 designates the usual hinged-door which gives access to the ice compartment. A scale platform of the usual construction consists of a rectangular frame comprising the end-bars 3—3 united by the longitudinal or side bars 4—4. The end-bars are also provided with the upwardly extending ears or lugs 5, and one of said bars is provided midway its length with a bracket 6 upon which is fulcrumed at its rear end the lever or fulcrum bar 7 which extending longitudinally of the compartment is pivotally connected to the plate 8, suspended from or carried by spring 9. A pair of levers 10 find a bearing at their outer ends upon the lugs or ears 5, and bear at their inner ends upon the upper side of the longitudinally extending lever or fulcrum-bar 7, at about the center of the scale platform.

Supported in turn upon the levers 10 is a skeleton platform consisting of end-bars 12, and longitudinally extending bars 13. This platform is adapted to receive the ice.

The spring 9 before referred to is gaged to a predetermined resistance and occupies a vertically extending groove 14 which forms the upper continuation of the vertical slot 15 in the end wall of the refrigerator, and the upper end of the spring is secured to a pin or hook 16 in the usual or any preferred manner. The plate 8 is formed at its front side with the vertical plate 17; said plate 17 being arranged at right angles to the plate 8 and extending from the upper end thereof downward beyond the lower end of the slot 15, and engaging a guide groove or recess 18 in the outer side of the refrigerator wall. This plate 17 is equal in width to the slot 15, and is designed as hereinafter explained, to prevent the entrance of outside air into the refrigerator at all times. A circular plate 19 is provided with a vertically depending projection 20 at its lower margin, and this plate is recessed in its rear side to receive a metal backing-plate 21; said plate extending vertically from the lower end of the extension or projection 20 to the upper margin of the circular plate 19. This backing-plate is secured to the rear side of the plate 19 by means of pins 22 the outer ends of which lie flush with the surface of the plate 19. The plates 20 and 21 are formed respectively with the vertically extending slots 23 and 24, and these slots register with the vertical slot 15 in the end-wall of the refrigerator, but are preferably of less width, and projecting horizontally outward from the center of plate 17 is a pin 25 which carries at its outer end an indicator-finger 26; said indicator-finger being preferably arranged horizontal and provided with two indicating points. The slot 23 of the extension 20 of the plate 19 is continued vertically upward and radially of the plate 19 as shown at 27, and occupying said slot normally, is a rack-bar 28; said rack-bar extending vertically upward from the pin 25 by which it is rigidly carried. Projecting from the backing-plate 21 into said slot is a guide-pin 29 which assists in guiding the rack-bar 28 in its vertical movement hereinafter referred to. In order that said rack-bar shall also be held from tilting forward in said slot, the plate 19 is recessed at 30, and loosely mounted upon a pin 31 projecting from the backing-plate is a disk 32; said disk being sufficiently large to overlap the front side of the rack-bar 28 and to find a balance or rest upon the outer end of the guide-pin 29. See Figs. 3 and 5. Cast integral with or carried rigidly by said disk is a gear pinion 33 which meshes with the teeth of the rack-bar 28. A ratchet-disk 34 is loosely mounted upon the pin 31, and a spring-pawl 35 carried by the disk 32 engages said ratchet-disk. A gear-pinion 36 cast integral with or carried rigidly by the ratchet-disk meshes with the teeth of the large register-disk 37 which occupies a circular recess 38 formed in the plate 19, and is provided with a central screw-threaded aperture which surrounds the stub-shaft or pin 39 projecting horizontally outward from the packing-plate. Pivotally mounted at 40 and occupying a recess 41 formed in the upper portion of the plate 19, is a gravity-pawl 42 which engages the toothed register-disk 37. In the figures shown in Sheet 1 of the drawings, this disk is provided with a scale running from zero to one thousand, and is adapted for use upon refrigerators where large quantities of ice may be weighed, or where it is desired to register the total amount of ice used in a given time, for instance the quantity of ice used in a month. A cover-plate 43 of similar shape as the plate 19 is secured upon the outer face of said plate 19 so that the interior mechanism carried thereby shall be hid from view, and this cover plate is provided with a segmental slot 44 in its upper portion through which the numbers as they successively occupy a position opposite the pointer 45 of said plate are exposed to view. The plate is also formed with a central hole or aperture through which the tubular hub 47 of the button or disk 46 is introduced to be screwed firmly into the register-disk 37. This tubular portion 47 of this button 46 loosely engages the stub-shaft or pin 39, and is adapted to rotate with the register-disk as hereinafter referred to. This cover plate is also provided with a vertically extending and narrow slot 48 through which the pin 25 projects. A pair of vertically arranged scale-bars or plates 49 and 50 are arranged upon the cover plate one at each side of the slot 48, the plate 49 being spaced by tens and numbered from zero to one hundred and twenty. The plate 50 is spaced by fives and also numbered to one hundred and twenty, and this plate may be further subdivided and may be numbered or not as desired. The plates 49 and 50 are also provided with longitudinally extending and vertical aligned slots 51 which engage clamping screws 52 carried by the cover plate. From this construction it will be seen that the scale bars 49 and 50 may be vertically adjusted if desired or necessary.

From the foregoing description, it will be seen that when a quantity of ice is placed upon the platform within the ice compartment, the weight thereof pivotally moving the lever 7 downward expands the spring 9 a corresponding distance which is indicated upon the scale plates 49 and 50 by the indicator-finger 26. Simultaneous with the downward movement of the indicator finger 26, the rack-bar carried by the pin 25 operates the pinion 33 carried rigidly by the disk 32, and the spring-pawl 35 carried by said disk causes the ratchet 34 to rotate also, and the pinion 36 carried by said ratchet rotates the register-disk 37 in the direction of the arrow, Fig. 4, until the number corresponding to the number of pounds indicated by the finger 26 shall be opposite the pointer 45 of the cover-plate and exposed to view through the slot 44 thereof. As the ice gradually melts in the refrigerator, the spring 9 retracts in a corresponding degree and moves the indicator-finger 26 upward so that at all times the quantity of ice in the refrigerator may be ascertained by referring to one of the scale-plates 49 or 50. By reason of the pawl 42 however, the register-disk is unable to move backward, and when the rack-bar carried by the pin 25 moves upward the disk 32 rotates in the direction of the arrow $a$ Fig. 4, and the pawl 35 thereof slips over the teeth of the ratchet disk 34.

From the foregoing it will be seen that the weight of each day's purchase is registered, so that at the end of a week or a month as the case may be, the exact number of pounds of ice used during the month is indicated. At times, however, after registering the amount of ice in the refrigerator it may be desirable or necessary to relieve the spring of the weight of the ice upon the platform, and to accomplish this I provide a cam-lever 55 which is pivotally mounted upon a pin 56 carried by the extension of the plate 19 below the slot 23 thereof. This lever is eccentrically pivoted so that when the lever is in the position shown in full lines Fig. 1, its approximately circular head projects upwardly a suitable distance to bear against the lower end of the rack-bar 28 when in its normal or elevated position, that is when there is no weight or pressure upon the scale platform. It will now be seen that the ice may be dropped in upon the platform without endangering the mechanism in the slightest degree, or registering a pound of ice, or if ice is already upon the platform it may be chipped during the day without injuring the scale or affecting the weight. By pivotally operating the lever 55 in the direction indicated by the arrow Fig. 1, to the inoperative position shown in dotted lines, the head is moved from contact with the lower end of the rack-bar 28, and the margin of the head nearest to the pivotal point of the lever is presented upward and lies in the same horizontal plane as the lower end of the slot 23; therefore leaving the rack-bar 28 free to descend when weight is applied upon the platform.

Marginally surrounding the plate 19 and extension 20 thereof is an ornamental rim 53 of any desirable configuration, and said rim is provided with a recess 54 in its lower end in which the cam-lever operates. After a certain number of pounds has been registered, and preferably when the platform is devoid of ice, by grasping the button 46, the disk 37 may be rotated in the direction of the arrow Fig. 4 until the zero point is again opposite the pointer 45 of the cover plate. If a monthly account is kept with the ice-man it will probably be necessary to operate the disk thus at the beginning of each month.

It is to be understood of course that while this device is specially adapted to weigh and register the amount of ice automatically, it may be used as a scale for weighing all ordinary commodities by removing the ice from the scale-platform.

From the above description, it will be seen that I have produced an ice-meter, which is positive and reliable in operation and which is simple, strong and durable of construction.

Having thus described my invention, what I claim as new, and desire to secure by Letters Patent, is—

1. In an ice-meter, the combination with a scale-platform, a spring, and an indicator carrying plate operatively connecting the spring and the fulcrum-bar of the platform, of a casing, a toothed register-disk, carried by the casing, and operatively connected up to rotate forward each time the scale-platform is depressed, and a pawl carried by the said casing, and engaging the toothed register-disk to prevent it rotating backward when the scale-platform is elevated, substantially as set forth.

2. In an ice-meter, the combination with a vertically movable platform located in a refrigerator, and supported upon levers and having the fulcrum-bar of said levers projecting into a vertical slot in the wall of said refrigerator, and a spring, and an indicator-finger carrying-plate fitting in said slot and operatively connecting the spring and the fulcrum bar or lever, of a plate secured to the refrigerator and having a slot registering with the slot in the wall of the refrigerator, a rack-bar occupying the slot of said plate and carried by the indicator-finger carrying-plate, a disk-carrying pinion engaging said rack-bar, and a ratchet-carrying pinion, a spring-pawl carried by the said disk and engaging said ratchet, and a toothed register-disk provided with a scale upon its face, and engaging the ratchet-carrying pinion, a gravity pawl engaging the toothed disk, and a cover plate fitting over the register-disk and having a pointer, substantially as set forth.

3. In an ice-meter, the combination with a scale-platform mounted in a refrigerator and upon levers and having the fulcrum bar of said levers projecting into a vertical slot in a wall of said refrigerator, and a spring located in a groove or continuation of said slot, of a plate fitting in said slot and operatively connecting the spring and the fulcrum bar, and adapted to always keep said slot closed so as to prevent the entrance of outside air into the refrigerator, and a pointer carried by said plate and projecting through said slot, and carrying an indicator-finger upon its outer end, and a scale-plate carried at the outer side of the refrigerator adjacent to said indicator-finger, substantially as set forth.

4. In an ice-meter, the combination with a scale-platform located in a refrigerator, and mounted upon levers, and having the fulcrum-bar of said levers projecting into a slot in a wall of the refrigerator, and a spring located in a groove or continuation of said slot, and an indicator-finger carrying-plate located in said slot and operatively connecting the spring and the fulcrum bar, of a vertically adjustable scale plate at the outer side of the refrigerator, substantially as set forth.

5. In an ice-meter, the combination with a scale-platform located in a refrigerator and mounted upon levers, and having the fulcrum-bar of said levers projecting into a slot in a wall of said refrigerator, a spring, and an indicator-finger carrying-plate operatively connecting the spring and the fulcrum bar, of a cam-lever pivotally mounted in such manner as to support the fulcrum bar in its elevated position, and thereby relieve the spring of all strain, or to leave the passage clear for the descent of the fulcrum bar, substantially as set forth.

6. In an ice-meter, the combination with a scale-platform located in a refrigerator, and mounted upon levers, and having the fulcrum-bar of said levers projecting into a slot in a wall thereof, a spring, and an indicator carrying-plate operatively connecting the spring and the fulcrum bar, and a scale-plate carried adjacent to the indicator-finger, of a toothed register-disk operatively connected to move forward as the fulcrum bar is depressed, and a pawl engaging said disk to prevent its back rotation, and a cover plate fitting over said disk and provided with an opening to expose the scale thereof, and having a pointer, and a button or handle whereby said disk may be rotated to bring its zero point or any other point opposite the pointer of the cover-plate, substantially as set forth.

In testimony whereof I affix my signature in the presence of two witnesses.

WILLIAM B. DICKSON.

Witnesses:
MAUD FITZPATRICK,
M. P. SMITH.